(12) United States Patent
Kelley et al.

(10) Patent No.: US 7,008,027 B2
(45) Date of Patent: Mar. 7, 2006

(54) MODULAR CASE UNITS

(75) Inventors: Ricky L. Kelley, Allegan, MI (US); Carl R. Hager, Grand Haven, MI (US)

(73) Assignee: Fleetwood Group, Inc., Holland, MI (US)

( * ) Notice: Subject to any disclaimer, the term of this patent is extended or adjusted under 35 U.S.C. 154(b) by 272 days.

(21) Appl. No.: 10/435,505

(22) Filed: May 9, 2003

(65) Prior Publication Data

US 2003/0222544 A1    Dec. 4, 2003

Related U.S. Application Data

(60) Provisional application No. 60/379,201, filed on May 9, 2002.

(51) Int. Cl.
*A47B 87/00* (2006.01)

(52) U.S. Cl. .................................. 312/107
(58) Field of Classification Search ............ 312/215, 312/107, 107.5, 108, 111, 140; 108/64; 403/321, 403/322.1, 322.4, 323; 292/113
See application file for complete search history.

(56) References Cited

U.S. PATENT DOCUMENTS

| 205,568 | A | | 7/1878 | Morris |
| 314,641 | A | | 3/1885 | Andrews |
| 1,203,589 | A | | 11/1916 | Curtenius |
| 1,602,383 | A | | 10/1926 | Andersson |
| 1,937,584 | A | | 12/1933 | North ........................... 45/9 |
| 2,489,493 | A | | 11/1949 | Kuenzie ..................... 312/107 |
| 3,201,883 | A | | 8/1965 | Schleisner-Meyer ....... 40/106.1 |
| 3,811,747 | A | * | 5/1974 | Levin ......................... 312/308 |
| 3,915,100 | A | * | 10/1975 | Sullivan ....................... 108/64 |
| 3,995,923 | A | | 12/1976 | Shell .......................... 312/111 |
| 4,433,881 | A | * | 2/1984 | Witten et al. ............ 312/107.5 |
| 4,530,136 | A | * | 7/1985 | Konkle ......................... 26/608 |
| 4,591,289 | A | | 5/1986 | Vickers et al. .............. 403/322 |
| 4,626,047 | A | | 12/1986 | Miciukiewicz ........... 312/107.5 |
| 4,844,565 | A | * | 7/1989 | Brafford et al. ......... 312/107.5 |
| 5,678,948 | A | | 10/1997 | White ......................... 403/321 |

* cited by examiner

*Primary Examiner*—James O. Hansen
(74) *Attorney, Agent, or Firm*—Van Dyke, Gardner, Linn & Burkhart, LLP

(57) ABSTRACT

A cabinet joining system for selectively joining adjacent portions of cabinet assemblies includes a slide member having a grasping surface and an end portion thereof and a support that is adapted for selectively supporting the slide member with respect to a portion of a cabinet assembly between extended and retracted positions of the slide member. A latch is provided as adapted for mounting to another portion of another cabinet assembly that is adjacent to the portion of the cabinet assembly supporting the slide member. A latch has a base and a clasp. The clasp is adapted for engaging the grasping surface of the slide member when the slide member is in its extended position and displacing the grasping surface towards the base.

14 Claims, 6 Drawing Sheets

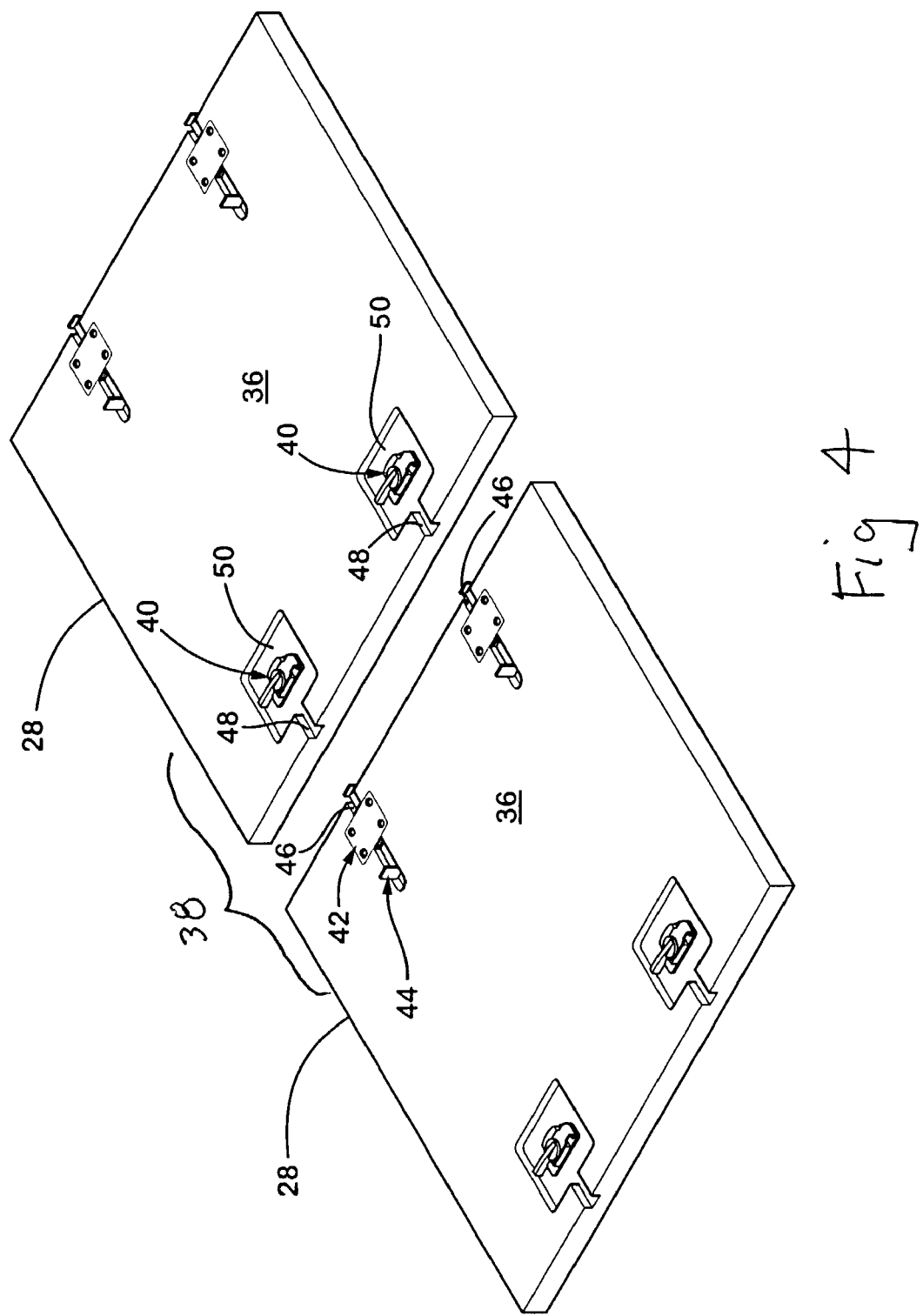

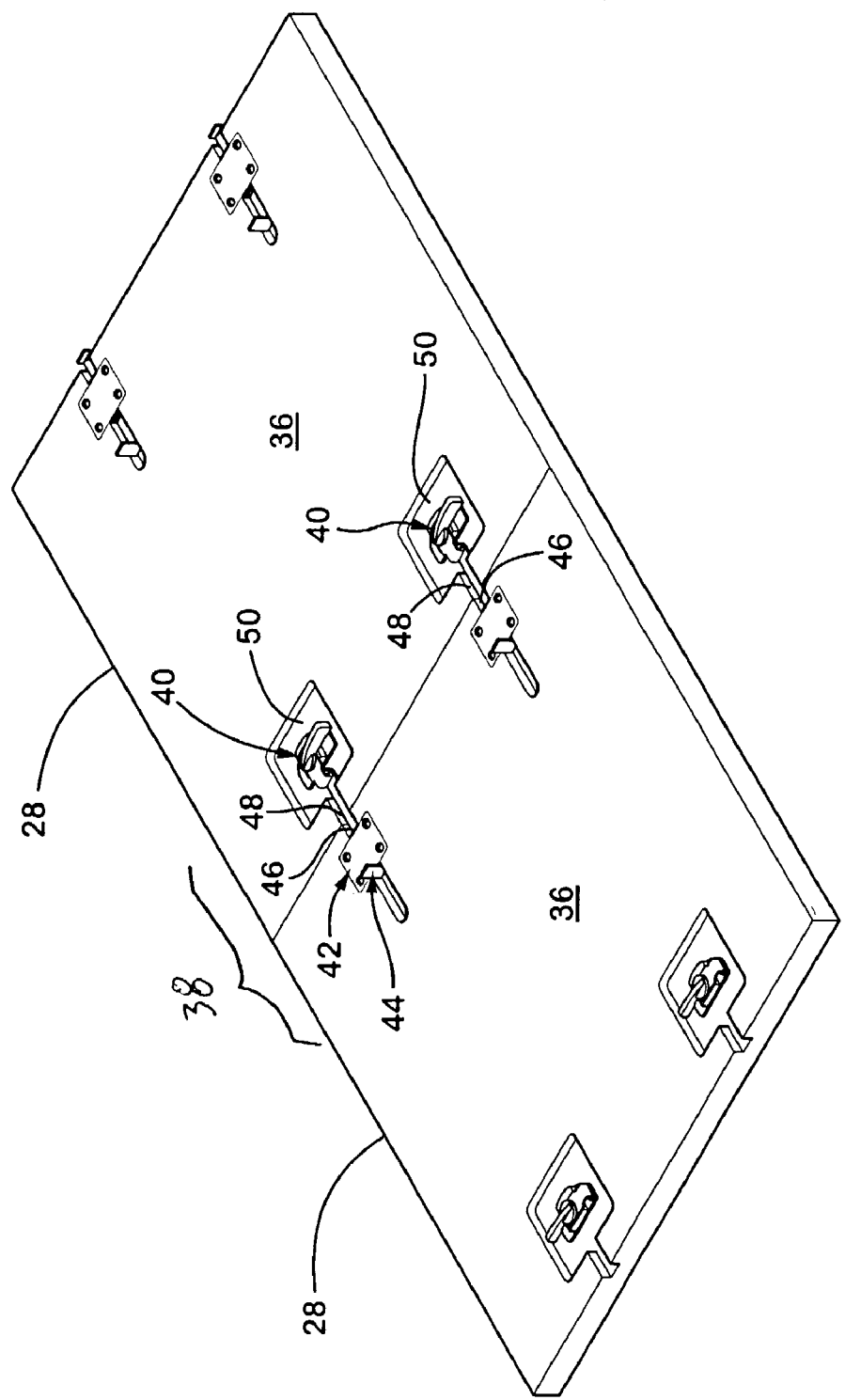

US 7,008,027 B2

MODULAR CASE UNITS

CROSS REFERENCE TO RELATED APPLICATION

This application claims priority from U.S. provisional patent application Ser. No. 60/379,201, filed on May 9, 2002, the disclosure of which is hereby incorporated herein by reference in its entirety.

BACKGROUND OF THE INVENTION

The present invention relates to case units and in particular to case goods that are modular, such that the units can be used individually or combined with other units. Although the invention is capable of many applications, it is particularly useful in classrooms.

Case goods are used typically both to store goods, such as supplies, books, and the like, and as a work surface, such as for artwork, and the like. Most case goods are permanently installed, which limits the ability to reconfigure the room. Moreover, reconfiguration must be done using tools and may leave damaged walls and floors exposed.

SUMMARY OF THE INVENTION

The present invention provides a line of cabinetry, or case goods, that can be installed and reconfigured without tools or carpentry work, but with the appearance of built-in cabinets. A cabinet joining system for selectively joining adjacent portions of cabinet assemblies, according to an aspect of the invention, includes a slide member having a grasping surface and an end portion thereof and a support that is adapted for selectively supporting the slide member with respect to a portion of a cabinet assembly between extended and retracted positions of the slide member. A latch is provided as adapted for mounting to another portion of another cabinet assembly that is adjacent to the portion of the cabinet assembly supporting the slide member. A latch has a base and a clasp. The clasp is adapted for engaging the grasping surface of the slide member when the slide member is in its extended position and displacing the grasping surface towards the base.

A cabinet assembly, according to an aspect of the invention, includes a lower portion adapted for supporting from a horizontal surface and a generally planar top member. The generally planar top member is attached to the lower portion. The top member has a lower surface facing the lower portion. A cabinet joining system is providing for selectively joining the top member with the top member of an adjacent cabinet assembly. The joining system includes a slide member having a grasping surface and end portion thereof and a support. The support selectively supports the slide member with respect to the lower surface between extended and retracted positions. The joining system further includes a latch mounted at the lower surface. The latch has a base and a clasp. The slide member selectively positions the grasping surface between the lower surface when in a retracted position. The slide member selectively positions the grasping surface at the latch of an adjacent cabinet assembly when in the extended position. The clasp is adapted for engaging the grasping surface of an adjacent cabinet assembly and displacing that grasping surface towards the base.

These and other objects, advantages and features of this invention will become apparent upon review of the following specification in conjunction with the drawings.

BRIEF DESCRIPTION OF THE DRAWINGS

FIG. 4 is a bottom view of adjacent cabinet assembly tops separated from each other;

FIG. 6 is the same view as FIG. 4 of the adjacent cabinet assembly tops joined together with the cabinet joining system of FIG. 5.

DESCRIPTION OF THE PREFERRED EMBODIMENT

Figure 1:
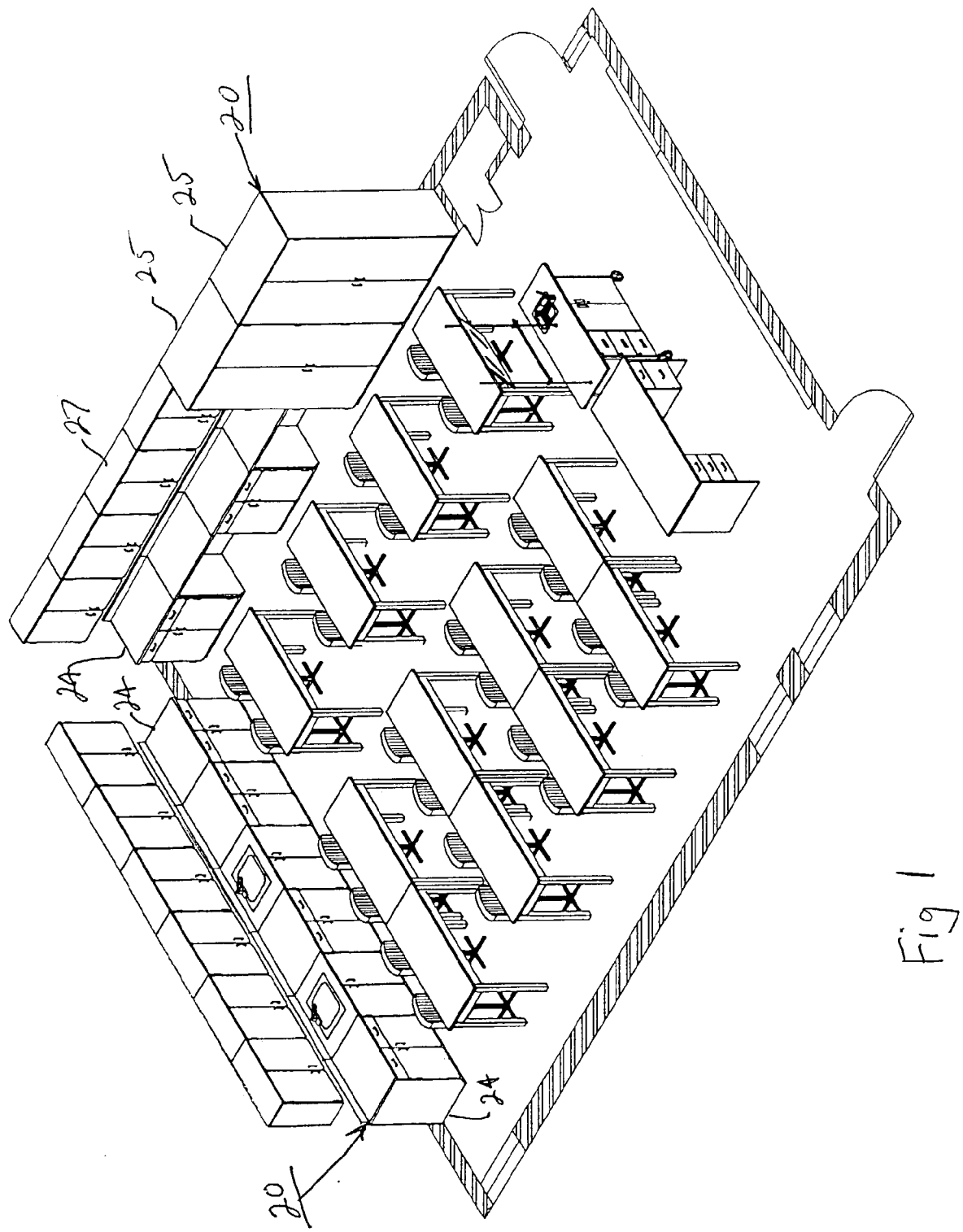
FIG. 1 is a perspective view of a room in which case goods, according to the invention, are installed in a particular configuration.
Figure 2:
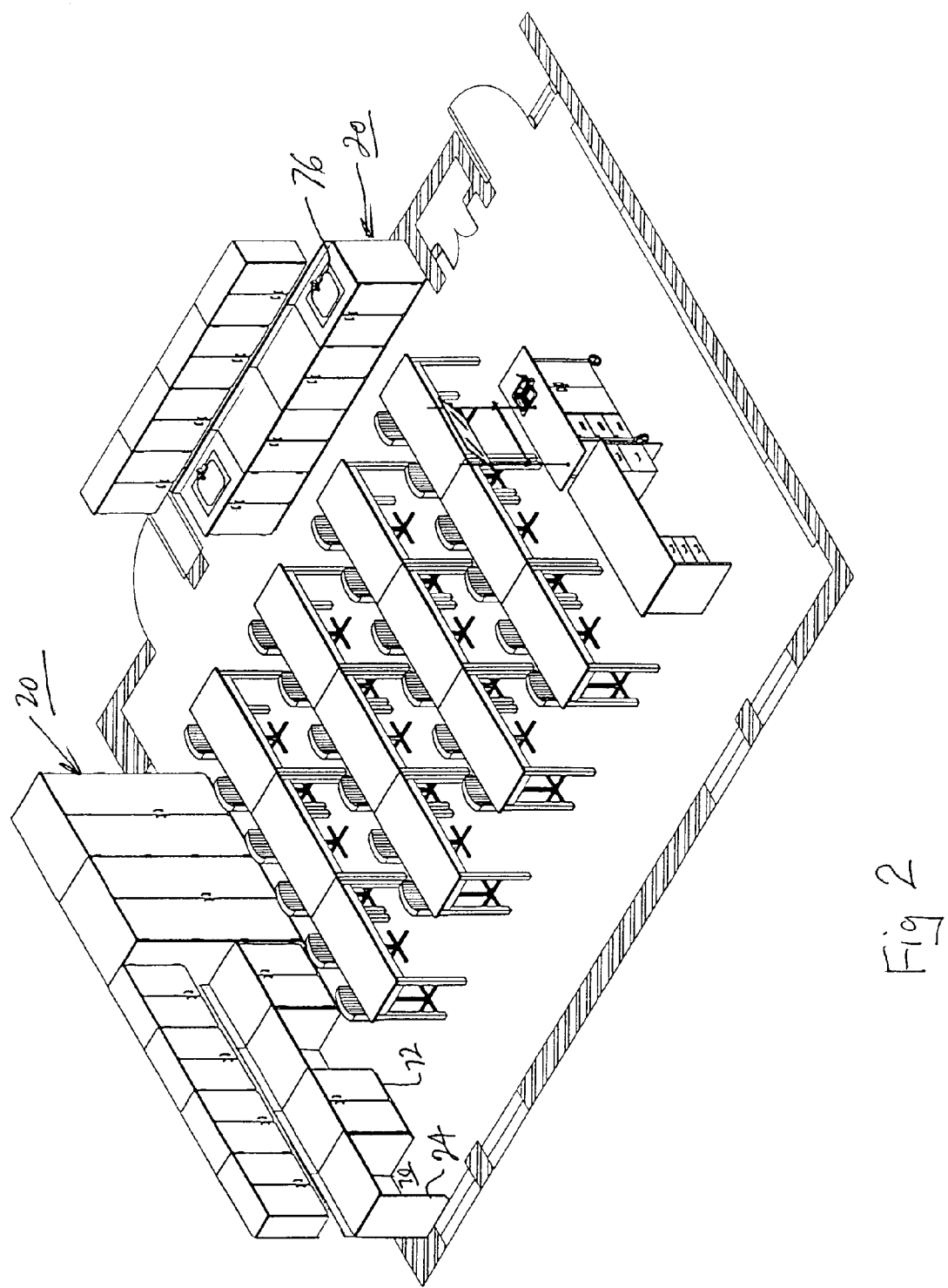
FIG. 2 is the same view as FIG. 1 with a different configuration of case goods.
Figure 3A:
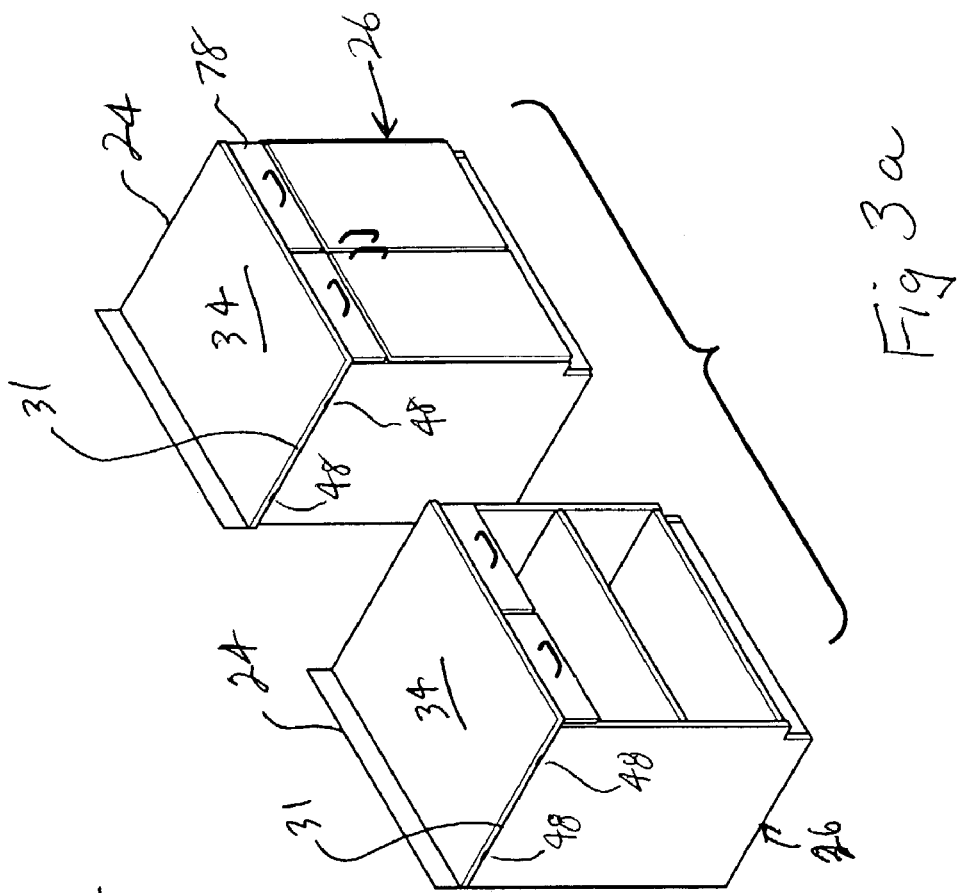
FIG. 3a is a perspective view of cabinet assemblies that are freestanding.
Figure 3B:
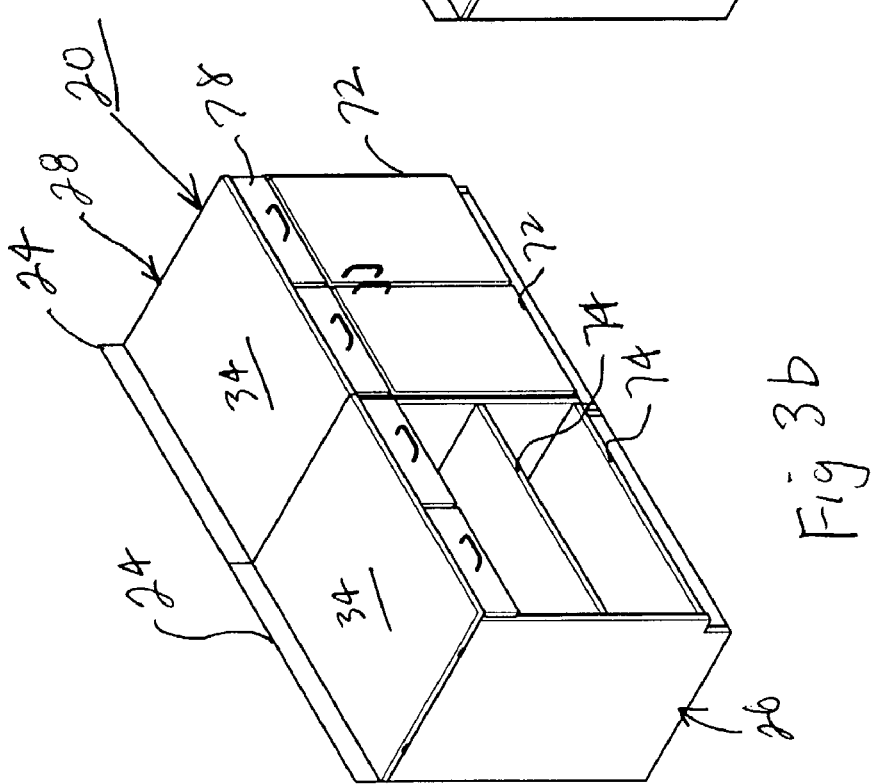
FIG. 3b is a perspective view illustrating the cabinet assemblies of FIG. 3a joined together in a case goods assembly.

Referring now to the drawings and the illustrative embodiments depicted therein, case goods 20 are made up of one or more cabinet assemblies 24 which may be arranged in a freestanding fashion, as illustrated in FIG. 3a, or joined together, as illustrated in FIG. 3b and in FIGS. 1 and 2. As seen in FIGS. 1 and 2, cabinet assemblies 24 may come in various forms, some including openings 70, some including doors 72, some including shelves 74, some including sinks 76, some including drawers 78, and the like. Each cabinet assembly has a lower portion 26 and a top member 28. Top member 28 may be defined as a work surface 34, or may support sink 76, or the like. As is understood in the art, such work surface may be covered by a suitable laminate to provide both aesthetic appearance and durability. Likewise, lower portion 26 may be made from laminate-covered particleboard, hardwood, or the like. While the invention is described with respect to a cabinet assembly having a work surface, it should be understood that the invention may be applied to frieze a full height wardrobe assembly 25 or other unit, such as wall unit 27. A comparison of FIGS. 1 and 2 illustrate the ability of case grids 20 to be arranged in various configurations, which can even be reconfigured as the needs of the application change.

Figure 5:
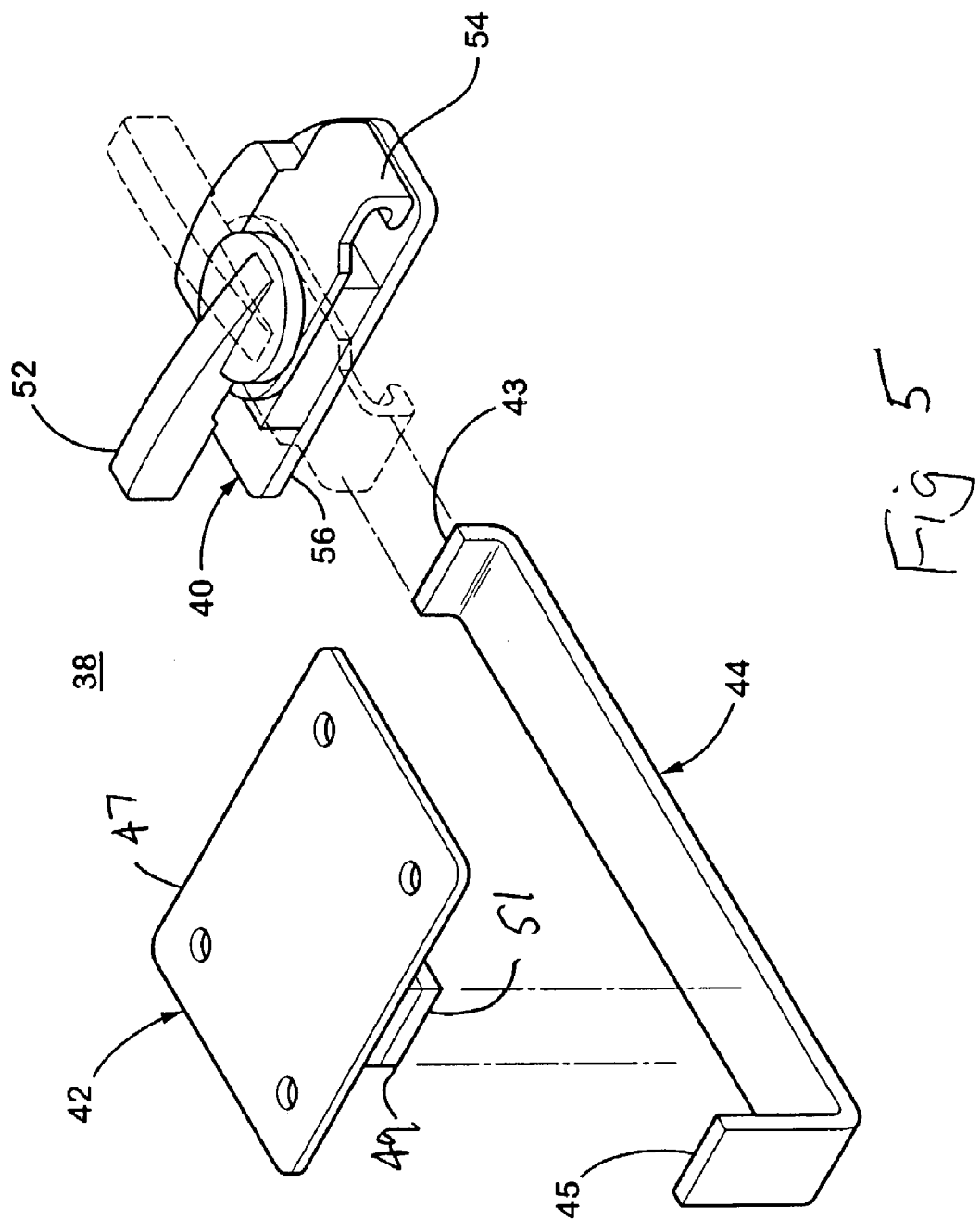
FIG. 5 is a perspective view of a cabinet joining system, according to the invention.

Cabinet assemblies 24 are selectively joined by a cabinet joining system 38 (FIGS. 4–6). System 38 includes a latch 40 positioned at an undersurface or lower surface of top member 28 and a slide 44 positioned at undersurface 36 of an adjacent top member. Cabinet joining system 38 further includes a support 42 which supports slide 44 between a retracted position illustrated in FIG. 4 and an extended position illustrated in FIG. 6. Slide 44 includes a grasping surface, such as defined by a lip 43. Lip 43 is illustrated at right angles to slide 44. However, it may be angled back toward slide 44. This gives further strength to the cabinet joining system. However, the grasping surface may be a groove in slide 44, or the like. Slide 44 may also include a user handle 45 for use in sliding the slide member between the retracted and extended positions. Support 42 may include a mounting member, such as a plate 47, and a slide member 49 extending from mounting member 46 and defining a slide surface 51 for slidably supporting slide 44.

Latch 40 includes a base 56 for mounting such as by openings (not shown) to a surface and a clasp 54 for selectively engaging grasping surface 43. Latch 40 further includes a user handle 52 for selectively manipulating clasp 54 as follows. In the position illustrated in FIG. 5, handle 52 and clasp 54 are arranged in opposite alignment with clasp 54 out of the way of grasping surface 43. As handle 52 is rotated to the phantom position illustrated in FIG. 5, clasp 54 is rotated with the handle. Therefore, if grasping surface 43 is juxtaposed with base 40, clasp 54 will capture the grasping surface. As handle 52 is further rotated as illustrated in FIG. 6, clasp 54 is moved in the direction of base 56. Latch 40 may be embodied in a window sash lock as is commonly available. Alternate forms of sash locks may be used. For example, clasp 54 may be defined by a turning cam which draws the grasping surface toward the base as the cam member is rotated.

When slide 44 is fully extended, a portion, such as handle 44, engages a fixed impediment, such as slide member 49 or mounting member 47. Thus, as clasp 54 is pulled towards base 56 by the rotation of handle 52 to the position of FIG. 6, a strong force is applied pulling top members 28 together. This strong force ensures a closed gap between the top members, which minimizes the appearance of the gap and minimizes the ability of any object to be lodged between the top members.

In the illustrative embodiment, a first channel 46 is formed in undersurface 36 of top member 28 for supporting slide 45. A second channel 48 terminating in a recess 50 is formed therein for supporting latch 40. In this embodiment, mounting member 47 is flush with surface 36 and slide member 49 extends into first channel 46 sufficiently to support slide 44 therein. In this embodiment, the cabinet joining system 38 may be effected solely from top member 28 without any substantial modification to lower portion 26. This allows channels 46, 48 to be confined to edges 31 of top member 28. As best seen in FIG. 3a, the openings for channel 46, 48 in edge 31 are minimal, thereby making cabinet joining system 38 largely unobtrusive and disguised when the cabinet assemblies are used in a freestanding fashion, as illustrated in FIG. 3a. Moreover, by extending from edge 31, both edge 31 and channels 46, 48 may be painted a dark color, such as dark gray or black, which further disguises the openings from edge 31. Moreover, lip 43 may be positioned in the opening for channel 46 at edge 31 when the slide 44 is in its retracted position as would be the situation when the cabinet assemblies are freestanding.

Thus, it is seen that the present application describes a cabinet joining system, which may be used to selectively and effectively join cabinet assemblies to form case goods. This may be carried out without the need for special tools. Although illustrated with two latches, slides and supports for each top member interface, the invention may be carried out with only one such combination or more than two. Other enhancements may be applied to the cabinet joining system. For example, automatic retracting members, such as springs or the like, may be utilized to move slide 44 to the retracted position when not being used to join cabinet assemblies together. Also, various caster assemblies and/or levelers may be utilized to assist in movement of the cabinet assemblies as well as to orient the assemblies in a level orientation. This further assists in providing unobtrusive seams between the top members.

In the illustrative embodiment, latch 40 is commercially available and is marketed by National Manufacturing Co. as a Model 602 sash lock.

Changes and modifications in the specifically described embodiments can be carried out without departing from the principles of the invention, which is intended to be limited only by the scope of the appended claims.

The embodiments of the invention in which an exclusive property or privilege is claimed are defined as follows:

1. A cabinet assembly, comprising:
    a lower portion adapted for supporting from a horizontal surface;
    a generally planar top member attached to said lower portion, said top member having a lower surface facing said lower portion; and
    a cabinet joining system for selectively joining said top member with the top member of an adjacent cabinet assembly, said joining system including a slide member having a grasping surface at an end portion thereof and a support assembly, said support assembly selectively supporting said slide member with respect to said lower surface between extended and retracted positions, said joining system further including a latch mounted at said lower surface, said latch having a base and a clasp, said slide member selectively positioning said grasping surface substantially below said lower surface when in said retracted position, said slide member selectively positioning said grasping surface at said latch of an adjacent cabinet assembly when in said extended position, said clasp adapted for engaging said grasping surface of an adjacent cabinet assembly and displacing that grasping surface toward said base.

2. The cabinet assembly of claim 1 including first and second channels defined in said top member offset from said lower surface, said first and second channels extending respectively to openings in opposite edges of said top member.

3. The cabinet assembly of claim 2 wherein said slide member is positioned in one of said first and second channels and said latch is positioned in the other of said first and second channels.

4. The cabinet assembly of claim 3 wherein said support assembly includes a mounting member adapted for mounting to said lower surface and a slide support extending from said mounting member and defining a slide surface for slidably supporting said slide member in said one of said first and second channels.

5. The cabinet assembly of claim 3 wherein said grasping surface comprises a lip.

6. The cabinet assembly of claim 5 wherein said lip substantially covers said a respective one of said openings when said slide member is in said retracted position.

7. The cabinet assembly of claim 5 wherein said slide member includes a user handle adapted for sliding said slide member.

8. The cabinet assembly of claim 7 wherein said user handle is at another end portion of said slide member that is opposite said end pardon.

9. The cabinet assembly of claim 1 wherein said latch comprises a user handle adapted for displacing said grasping surface toward said base.

10. The cabinet assembly of claim 9 wherein said user handle is rotatable with respect to said base.

11. The cabinet assembly of claim 10 wherein said user handle is rotatable a first angular distance to juxtaposition said clasp with said grasping surface and a second angular distance to displace said grasping surface toward said base.

12. The cabinet assembly of claim 1 wherein said lower portion includes at least one chosen from a drawer, a door and a shelf.

13. The cabinet assembly of claim 1 wherein said top member defines an upper work surface.

14. A case good system, comprising:
    first and second cabinet assemblies;
    each of said cabinet assemblies including a lower portion adapted for supporting from a horizontal surface and a generally planar top member attached to said lower portion, said top member having a lower surface facing said lower portion;

a cabinet joining system for selectively joining said top members of said first and second cabinet assemblies, said joining system including a slide member having a grasping surface at an end portion thereof and a support assembly, said support assembly selectively supporting said slide member with respect to said lower surface of one of said cabinet assemblies between extended and retracted positions of said slide member, said joining system further including a latch mounted at said lower surface of the other of said cabinet assemblies, said latch having a base and a clasp, said slide member selectively positioning said grasping surface substantially below said lower surface of said one of said cabinet assemblies when in said retracted position, said slide member selectively positioning said grasping surface at said latch when in said extended position, said clasp adapted for engaging said grasping surface and displacing said grasping surface toward said base.

* * * * *

UNITED STATES PATENT AND TRADEMARK OFFICE
CERTIFICATE OF CORRECTION

| | |
|---|---|
| PATENT NO. | : 7,008,027 B2 |
| APPLICATION NO. | : 10/435505 |
| DATED | : May 9, 2003 |
| INVENTOR(S) | : Ricky L. Kelly and Carl R. Harger |

It is certified that error appears in the above-identified patent and that said Letters Patent is hereby corrected as shown below:

<u>Column 4</u>:
Line 49, Claim 8, "pardon" should be --portion--.

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,008,027 B2 | Page 1 of 1 |
| APPLICATION NO. | : 10/435505 | |
| DATED | : March 7, 2006 | |
| INVENTOR(S) | : Ricky L. Kelly and Carl R. Harger | |

It is certified that error appears in the above-identified patent and that said Letters Patent is hereby corrected as shown below:

Column 4:
Line 49, Claim 8, "pardon" should be --portion--.

This certificate supersedes the Certificate of Correction issued November 11, 2008.

Signed and Sealed this

Ninth Day of December, 2008

JON W. DUDAS
*Director of the United States Patent and Trademark Office*